US008837556B2

(12) United States Patent
Jonsson et al.

(10) Patent No.: US 8,837,556 B2
(45) Date of Patent: Sep. 16, 2014

(54) METHOD AND APPARATUS FOR BLIND DETECTION OF SECONDARY PILOT SIGNAL IN A WIRELESS COMMUNICATION SYSTEM

(75) Inventors: Elias Jonsson, Malmö (SE); Kazuyoshi Uesaka, Kawasaki (JP)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/452,652

(22) Filed: Apr. 20, 2012

(65) Prior Publication Data

US 2013/0279555 A1 Oct. 24, 2013

(51) Int. Cl.
*H04B 1/00* (2006.01)
(52) U.S. Cl.
USPC .......................................... 375/148; 375/147
(58) Field of Classification Search
USPC ................................. 375/148, 147, 140, 130
See application file for complete search history.

(56) References Cited

U.S. PATENT DOCUMENTS

| | | | | |
|---|---|---|---|---|
| 2004/0160921 | A1* | 8/2004 | Kaipainen et al. | 370/335 |
| 2006/0067292 | A1* | 3/2006 | Ong et al. | 370/342 |
| 2007/0253450 | A1* | 11/2007 | Kuroda et al. | 370/500 |
| 2007/0268869 | A1* | 11/2007 | Lundby et al. | 370/332 |

\* cited by examiner

*Primary Examiner* — Chieh M Fan
*Assistant Examiner* — Brian J Stevens
(74) *Attorney, Agent, or Firm* — Murphy, Bilak & Homiller, PLLC

(57) ABSTRACT

In one aspect, the present invention provides for blindly detecting the presence of one or more secondary pilot signals that are not being used to serve a communication apparatus, such as a User Equipment (UE). Among its several advantages, the approach to blind detection taught herein provides robust detection performance, yet it requires relatively few receiver resources. The contemplated apparatus, in at least one example embodiment, uses its blind detection of secondary pilot signal(s) to trigger suppression of secondary pilot interference, for improved reception performance. In a particular, non-limiting example, the apparatus operates in an HSDPA-MIMO network in a non-MIMO mode and blindly detects secondary pilot signal energy associated with the supporting network providing MIMO service to nearby equipment.

22 Claims, 5 Drawing Sheets

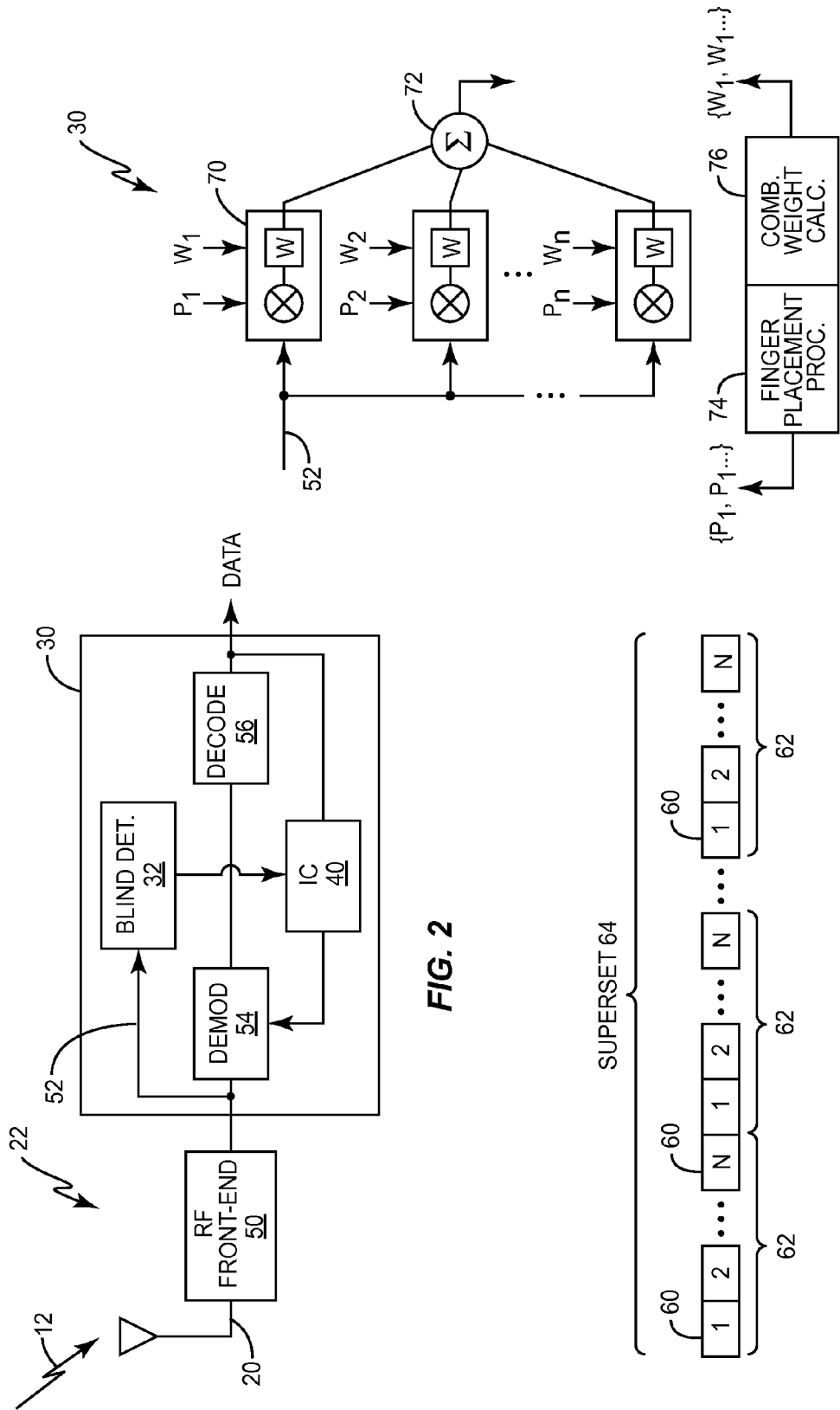

METHOD AND APPARATUS FOR BLIND DETECTION OF SECONDARY PILOT SIGNAL IN A WIRELESS COMMUNICATION SYSTEM

TECHNICAL FIELD

The present invention generally relates to wireless communications, and particularly relates to blind detection of secondary pilot signals in a wireless communication system.

BACKGROUND

High-Speed Downlink Packet Access (HSDPA) provides data transfer speeds and capacity in networks based on Universal Mobile Telecommunications System (UMTS). The use of Multiple-Input-Multiple-Output (MIMO) transmission schemes provide further gains when applied to HSDPA. MIMO-based transmissions involve the transmission of different data streams from different antennas or antenna elements.

For example, a MIMO-capable receiver would receive transmissions from the network from first and second transmit antennas (Tx1 and Tx2), including a Primary Common Pilot Channel (P-CPICH) signal from Tx1 and a Secondary Common Pilot Channel (S-CPICH) from Tx2. Pilot signals from the different antennas aid channel estimation at the MIMO receiver with respect to the involved Tx/Rx antenna pairings.

Of course, there may be legacy equipment not capable of operating in any MIMO modes, or equipment operating in channel conditions that do not support MIMO operation. Thus, it may be that all channels of interest for a non-MIMO receiver originated from Tx1, with the S-CPICH transmissions from Tx2 appearing as colored noise at the non-MIMO receiver. As will be appreciated by those of skill in the art, such noise is difficult to cancel using linear equalization.

Further, in the most general case, the non-MIMO receiver will not have any knowledge of whether S-CPICH transmissions are present, nor any knowledge of the particular channel or channels that carry S-CPICH transmissions. In this and in other regards, it therefore is difficult for non-MIMO receivers to deal with interference arising from S-CPICH transmissions in the same or surround areas of operation within the supporting network.

SUMMARY

In one aspect, the present invention provides for blindly detecting the presence of one or more secondary pilot signals that are not being used to serve a communication apparatus, such as a User Equipment (UE). Among its several advantages, the approach to blind detection taught herein provides robust detection performance yet it requires relatively few receiver resources. The contemplated apparatus, in at least one example embodiment, uses its blind detection of secondary pilot signal(s) to trigger suppression of secondary pilot interference, for improved reception performance. In a particular, non-limiting example, the apparatus operates in an HSDPA-MIMO network in a non-MIMO mode and blindly detects secondary pilot signal energy associated with the supporting network providing MIMO service to nearby equipment.

In one or more embodiments, a method of received signal processing at a wireless communication apparatus is directed to blind detection of secondary pilot signals. In an example case, the contemplated method includes receiving a composite signal that may include a secondary pilot signal transmitted from a remote antenna not used for serving the wireless communication apparatus and accumulating detection results over a number of measurement intervals, for each candidate channel among a number of candidate channels that are known candidates for carrying the secondary pilot signal.

In each such measurement interval, the method includes measuring a signal energy for the received composite signal on a selected one of the candidate channels and logically deciding whether secondary pilot signal energy is present. The logical decision—e.g., deciding whether secondary pilot signal energy is "present" or "not present"—is based on comparing the measured signal energy to a comparison threshold. The detection result being accumulated for the selected candidate channel is updated for the current measurement interval by an amount dependent upon the logical decision.

The method further includes evaluating the accumulated detection results to blindly detect whether the secondary pilot signal is present on any of the candidate channels. One or more actions may be triggered at the apparatus in response to the blind detection of secondary pilot signal energy in the received composite signal. For example, in at least one embodiment herein, such detection triggers the suppression of secondary pilot signal energy in the received composite signal by the apparatus, for corresponding improvements in reception performance.

The above method and variations or extensions of it may be implemented via appropriate configuration of a wireless communication apparatus. An example apparatus includes a receiver that is configured to receive a composite signal that may include a secondary pilot signal transmitted from a remote antenna not used for serving the apparatus. Here, the phrase "composite" signal denotes a received signal that may have multiple signal components, e.g., desired signal components and interfering signal components.

The apparatus includes a blind detection circuit that is configured to: accumulate detection results over a number of measurement intervals for each candidate channel among a number of candidate channels that are known candidates for carrying the secondary pilot signal, and to evaluate the accumulated detection results to blindly detect whether the secondary pilot signal is present on any of the candidate channels. In an example implementation, the blind detection circuit includes: a measurement circuit that is configured to, for each measurement interval, measure a signal energy for the received composite signal on a selected one of the candidate channels; and an updating circuit that is configured to, for each such measurement interval, logically decide whether secondary pilot signal energy is present based on comparing the measured signal energy to a comparison threshold, and update the detection result for the selected candidate channel by an amount dependent upon the logical decision.

As noted, the wireless communication apparatus may make advantageous use of its blind detection of secondary pilot signals in any number of ways. In one example, the apparatus includes an interference cancellation circuit. Here, in response to blindly detecting that the secondary pilot signal is present on one of the candidate channels, the apparatus uses the interference cancellation circuit to suppress interference arising from the secondary pilot signal in the received composite signal, or in a desired signal included within the received composite signal.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a block diagram of example details for one embodiment of a receiver such as may be used in the wireless communication apparatus in FIG. 1.

FIG. 3 is a diagram of measurement intervals, sets of measurement intervals, and supersets of such sets, all as may be used in one embodiment of signal measurements made for blind detection for secondary pilot signals.

FIG. 4 is a block diagram of an example RAKE receiver embodiment that may be implemented in the apparatus of FIG. 1.

DETAILED DESCRIPTION

Figure 1:
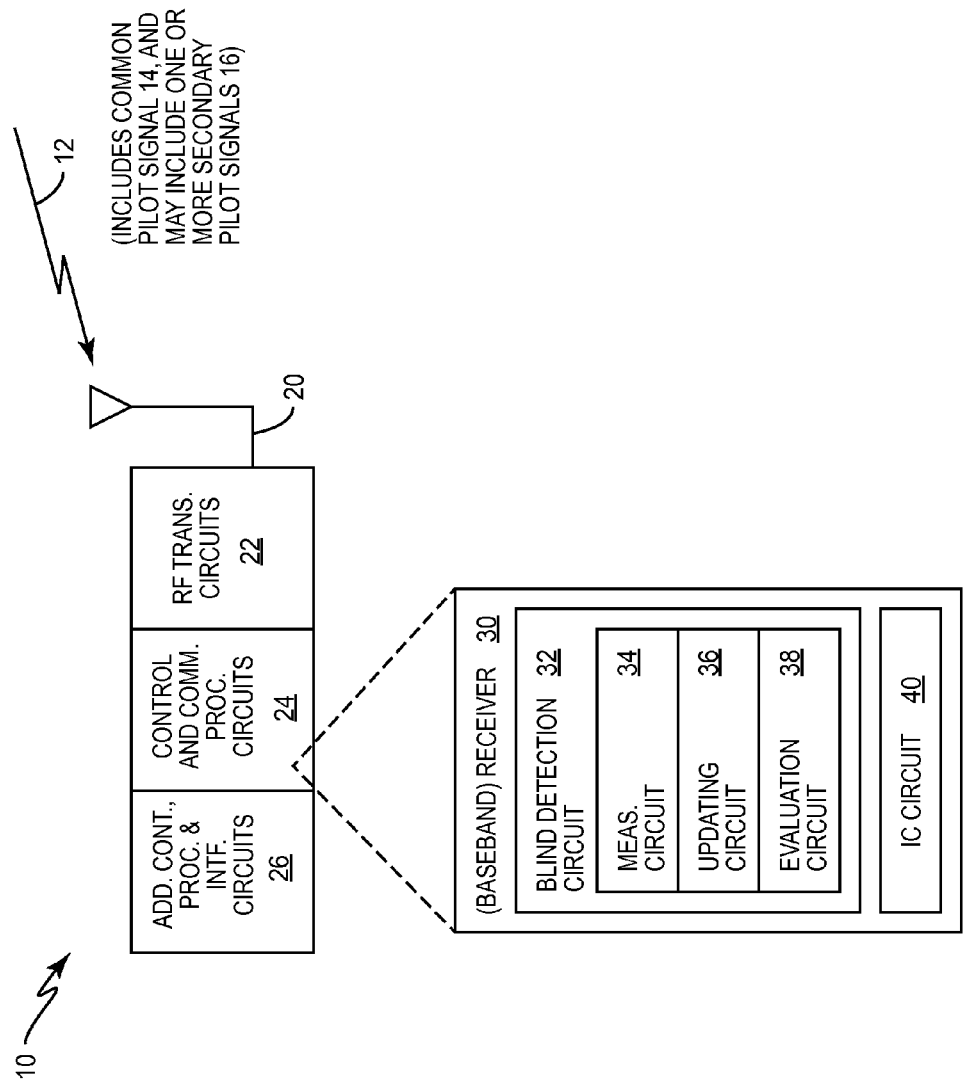
FIG. 1 is a block diagram of one embodiment of a wireless communication apparatus that is configured to blindly detect secondary pilot signals.

FIG. 1 illustrates an example embodiment of a wireless communication apparatus 10 that receives a composite signal 12 that at least sometimes include multiple signals originating from multiple antennas or antennal elements at a remote transmitter operating as a base station or other radio network node in a wireless communication network. In at least one example embodiment, the network—not explicitly shown in FIG. 1—comprises an HSDPA-MIMO network providing MIMO and non-MIMO service to apparatuses operating within its coverage area(s). The wireless communication apparatus 10 in an example case is a User Equipment (UE), but that will be understood as a non-limiting example.

Thus, the wireless communication apparatus 10 (hereafter, "apparatus 10") in an example case may be regarded as a "user" in the network and there may be multiple other users operating in and around the service area associated with the apparatus 10. Thus, the composite signal 12 as received by the apparatus 10 may include multiple signal components associated with serving all users. From the perspective of the apparatus 10, some of these signals are desired and some are interfering.

In the illustrated example, the received composite signal 12 at the apparatus 10 includes a common pilot signal 14, and it may include one or more secondary pilot signals 16, such as are used by networks to support Multiple-Input-Multiple-Output (MIMO) transmissions by the network from multiple antennas to particular users. In a particular example, the common pilot signal is a P-CPICH signal from a particular base station transmit antenna in a HSDPA-MIMO network and the secondary pilot signals are S-CPICH signals from one or more other network transmit antennas. Here, it may be assumed that the apparatus 10 is not operating in a MIMO mode and that the secondary pilot signals 16, to the extent that any are present in its received composite signal 12, represent undesired interfering signal components.

The apparatus 10 as illustrated includes RF transceiver circuits 22, along with control and communication processing circuits 24. Optionally, the apparatus 10 includes additional control, processing, and interface circuits 26, the presence and nature of which will depend on the intended use of the apparatus 10. According to further example details, the control and communication processing circuits 24 include a receiver 30 that at least functionally includes a blind detection circuit 32. In turn, the blind detection circuit 32 at least functionally includes a measurement circuit 34, an updating circuit 36, an evaluation circuit 38, and, in one or more embodiments, an interference cancellation (IC) circuit 40.

It will be appreciated that the apparatus 10 may include additional circuits in its received signal chain. For example, with reference to FIG. 2, one sees that the RF transceiver circuits 22 include an RF front-end 50 providing filtering, amplification, down conversion and digitization of the received composite signal 12. By such operation, the receiver 30 receives streams of digital samples that represent the time-varying, antenna-received composite signal 12. In FIG. 2, the digitized version of the received composite signal carries the reference number 52. Unless needed for clarity, references herein to the "received composite signal" will be understood as referring to the signal 12, or, equivalently, to the signal 52.

Further in FIG. 2, the receiver 30 includes a demodulator circuit 54 that demodulates the received composite signal (52) and provides the corresponding demodulation output—e.g., detection statistics comprising Log-Likelihood-Ratios or LLRs, or other soft bit values—to a decoding circuit 56. The decoding circuit 56 outputs data as recovered from the received composite signal 52, where such data comprises, for example, soft bit values for one or more signal components in the received composite signal 52.

The illustrated IC circuit 40 performs interference cancellation based on the blind detection circuit 32 determining whether there is secondary pilot signal energy on any of the channelization codes that are known candidates for transmission of secondary pilot signals 16. In this manner, the apparatus 10 advantageously "learns" the channelization code(s) that are in use for secondary pilot transmissions by virtue of its blind detection of pilot signal energy on those channelization codes. Correspondingly, this knowledge of the channelization codes in use by the network for secondary pilot signal transmission allows the IC circuit 40 to regenerate the detected secondary pilot signals 16 at the chip level, for interference cancellation feedback to the demodulator 54, for example.

For these and other operations, the receiver 30 is implemented using fixed circuitry, or programmable circuitry, or some combination of fixed and programmable circuits. In either case, however, whether through its fixed circuit configuration and/or through software/firmware configuration of programmable circuitry, the receiver 30 is configured to perform blind detection of secondary pilot signals 16, as taught herein. In at least one such embodiment, the receiver 30 comprises one or more baseband processors, e.g., a DSP, microcontroller, or other digital processing circuit that is configured according to the execution of computer program instructions stored in a memory circuit or other computer-readable medium that is in or accessible to the receiver 30.

Because the secondary pilot signal(s), when present, are not associated with antennas being used to serve the apparatus 10 in its non-MIMO operation, those secondary pilot signals appear as colored interference in the received composite signal 12. Referring momentarily to FIG. 3, the blind detection circuit 32 is configured to accumulate detection results over a number of measurement intervals 60, for each candidate channel among a number of candidate channels that are known candidates for carrying the secondary pilot signal 16. FIG. 3 depicts like-sized groupings of measurement intervals 60, referred to as sets 62, and like-sized groupings of sets 62 into corresponding supersets 64.

In an example case, each measurement interval 60 comprises one "slot" of a HSDPA Transmission Time Interval (TTI). Thus, in each one in a succession of slots, the receiver 30 evaluates the received signal energy of the received composite signal on a specific channelization code that is known for use in secondary pilot signal transmission. The receiver 30 makes a logical "present"/"not present" decision for that channel in that slot, and adjusts an accumulation result for that channel. The receiver 30 checks the next candidate channel in the next slot, and so on, and eventually wraps back around to the beginning of the candidate channels, and repeats the per-channel accumulations.

Thus, in one approach, measurement results for each candidate channel are determined in one measurement interval 60 per set 62. Thus, the number of measurement intervals 60 comprising one set 62 is defined by the number of candidate channels being evaluated for the presence of secondary pilot signal energy. These results are accumulated in some sense across all of the sets 62 in one superset 64. That is, the accumulated result for a given candidate channel is a function of the results determined for that channel in the corresponding measurement interval 60 in each of the sets 62 included within the superset 64.

It will be appreciated that the number of per-slot determinations desired for accumulating will define the number of sets 62 included in each superset 64. Merely as a non-limiting example, assume that there are thirty candidate channelization codes known for use in secondary pilot signal transmission. Correspondingly, there would be thirty measurement intervals 60 per set 62. Further, assume that each measurement interval 60 is a slot, and that for good filtering performance it is desired to accumulate results over sixteen slots for each candidate channel. As such, there would be sixteen sets 62 per superset 64 and it would take 30 slots/set×16 sets=480 slots to accumulate blind detection results for all channelization codes of interest.

In at least one embodiment where each measurement interval 60 comprises a transmission slot, the blind detection circuit 32 is configured to accumulate the detection results by updating the detection result for each one of the candidate channels in a respective measurement interval 60 in a set 62 of successive measurement intervals 60, and repeating the updating over a superset 64 of the sets 62 of successive measurement intervals 60. By such operations, the detection result for each candidate channel is accumulated over a defined number of respective measurement intervals 60 within the superset 64.

Further, in at least one such embodiment, the blind detection circuit 32 is configured to accumulate the detection result for each candidate channel over the defined number of respective measurement intervals 60 within the superset 64 by calculating an exponentially filtered detection result for each candidate channel over the superset 64.

In an example, let the detection result for any k-th one of the K candidate channels be expressed as DR(k). Further, let there be N updates determined for accumulating the detection result for each candidate channel, with one such update per set 62 of successive measurement intervals 60. As such, each superset 64 contains N sets 62 of K successive measurement intervals 60. In one or more embodiments, the updating circuit 36 is configured to perform each updating as $DR(k)=(1-\lambda)DR(k)+\lambda$, if the logical decision in the current update interval 60 for the k-th candidate code is that the secondary pilot signal energy is present. Otherwise, the update for the current measurement interval 60 is $DR(k)=(1-\lambda)DR(k)$, where $\lambda=1/N$ and $N \geq 1$.

In one or more example embodiments, the receiver 30 comprises a RAKE receiver. For example, refer to FIG. 4 for a moment, which at least partially depicts a RAKE receiver embodiment of the receiver 30, having a plurality of RAKE fingers 70, and wherein the SIR comprises a RAKE-SIR corresponding to a RAKE-combined signal obtained from a number of the RAKE fingers 70 in the receiver 30 that are allocated to the selected candidate channel in each measurement interval 60.

Thus, in each measurement interval 60, some number of RAKE fingers 70, e.g., a small number representing only a minor consumption of RAKE receiver resources, are set to the channelization code being evaluated for the presence of secondary pilot signal energy. The despread signals produced by the allocated RAKE fingers 70 are combined in a combining circuit 72, as is known to those skilled in the art. A finger placement processor 74 generates the correct correlation code and the appropriate multipath offsets $\{P_1, P_2, \ldots, P_n\}$, and a combining weight circuit 76 generates the corresponding weights $\{W_1, W_2, \ldots, W_n\}$ for RAKE combining.

In any case, in one or more embodiments herein, the detection of a S-CPICH signal in a HSDPA network is done by measuring the RAKE SIR on potential S-CPICH channelization codes in a code set that is reserved or otherwise known for use in S-CPICH transmission. Use of the RAKE SIR offers a number of advantages. For example, RAKE SIR is not a complex measurement and thus does not consume significant received signal processing resources (computations). The following outline describes a preferred example setup:

a small number of RAKE fingers/despreaders 70 (e.g., one to three fingers) set aside for S-CPICH measurements in each measurement interval 60;

RAKE SIR for S-CPICH is calculated the current measurement interval 60 for a corresponding one of the candidate channels—that is, measurement is based on a coherent summation of S-CPICH over the current measurement interval 60 (e.g., slot);

blind detection processing monitors codes between C256,2 and C256,31, apart from those known to be used for other signals—e.g., C256,0 is used by P-CPICH and C256.1 is used by P-CCPCH, according to 3GPP;

one channelization code at a time is monitored. Each monitoring interval 60 equals one slot in this example—this means that it will take 31−1=30 slots between two monitoring occasions for any given one of the candidate channels and, notably, this sequential approach does not require significant computation resources and can be understood in some sense as a "background" processing task run by the receiver 30;

in each measurement interval 60, the receiver 30 estimates a RAKE SIR, SIR(k), where k denotes the channelization code, based on executing the following pseudo code, where the term "s_cpich_used(k)" denotes the detection result (earlier denoted as "DR(k)") being accumulated for the k-th channelization code and "lambda" denotes λ

If $\frac{SIR(k)}{SIR(0)} > \tau$ then s_cpich_used(k) =

(1-lambda) × s_cpich_used(k) + lambda else s_cpich_used(k) = (1-lambda) × s_cpich_used(k)

Here, lambda is a filter factor, e.g., lambda=1/16. Thus, the updating circuit 36 can be understood as filtering the number of times an SIR above a threshold value τ is measured for each one of the candidate channels being monitored.

In this embodiment, the receiver 30 advantageously uses the ratio to SIR(0), which represents the P-CPICH measurement at the receiver 30. This normalization to the received signal energy of the P-CPICH reflects the fact that the network base station supporting the apparatus 10 will always transmits P-CPICH from channelization code k=0 and that the S-CPICH transmit power is less then 6 dB at most.

Now, let $k_{max}$ be the index corresponding to the largest s_cpich_used(k) value accumulated by the receiver 30. The evaluation circuit 38 concludes that code $k_{max}$ is used by the network for S-CPICH transmission if the s_cpich_used(k_max) value is larger than the noise floor, that is, if for some constant c, $$s\_cpich\_used(k\_max) > c \frac{1}{29} \sum_{\substack{k=2 \\ k \neq k_{max}}}^{31} s\_cpich\_used(k)$$

then the evaluation circuit 38 makes the logical conclusion that code $k_{max}$ is being used for S-CPICH transmission.

Figure 5:
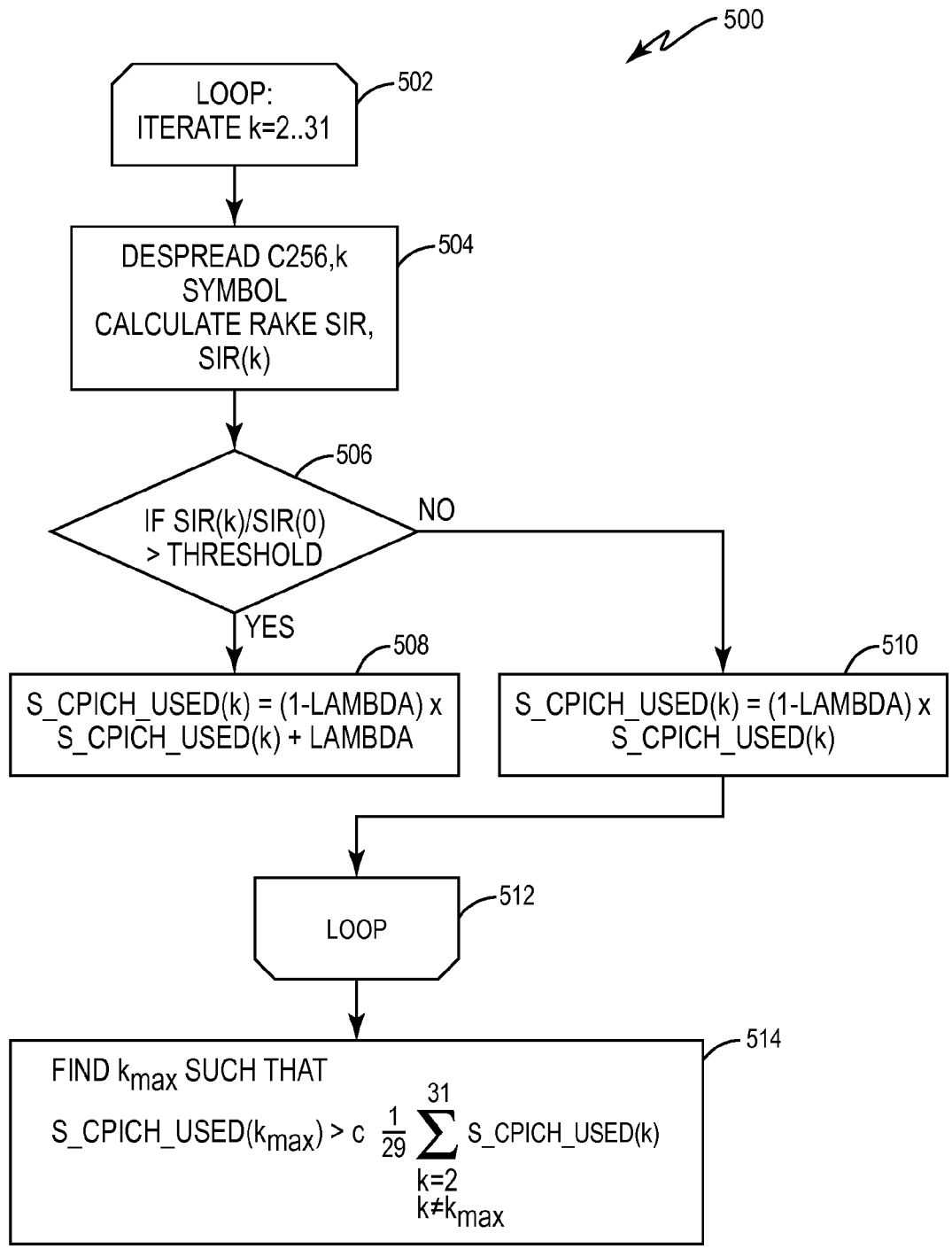
FIG. 5 is a logic flow diagram of example details for a method of blindly detecting secondary pilot signals.

FIG. 5 presents an example processing method 500 implemented by the blind detection circuit 32, in accordance with the foregoing example. The illustrated processing is looped (Block 502) to cover the individual channel codes being monitored (k=2, . . . , 31). Processing in each loop includes despreading a symbol in the current measurement interval 60 on code C256,k, and calculating a corresponding RAKE SIR, SIR(k) (Block 504).

Processing continues with a comparison (Block 506) of SIR(k) to the defined comparison threshold, e.g., τ. If SIR(k) is greater than the defined threshold (YES from Block 506), then processing continues with updating the detection result being accumulated for the k-th channelization code as set forth in Block 508. On the other hand, a "NO" from Block 506 results in a different updating of the detection result as compared to that done in Block 508. That is, the updating in Block 510 omits the "+lambda" component of the update calculation, meaning that the value of the numerical updating applied to s_cpich_used(k) value for the k-th channel code in the current measurement interval 60 depends on the signal energy evaluation, e.g., SIR(k)/SIR(0). Because the updating depends discretely on the evaluation—i.e., include or do not include the "+lambda" term, this updating process may be understood as a logical, "present" or "not present" evaluation.

Once looping over all measurement intervals 60 for all channel codes k of interest, the method 500 continues with determining whether the accumulated detection results indicate that a S-CPICH is being transmitted on one of the channel codes k. That is, as shown in Block 514, the method 500 identifies the largest one of the accumulated detection results (k_max), and it compares that to the remaining ones of the accumulated detection results, e.g., as $$s\_cpich\_used(k_{max}) > c \frac{1}{29} \sum_{\substack{k=2 \\ k \neq k_{max}}}^{31} s\_cpich\_used(k).$$

Among the several advantages of the above processing is that it is simple and does not consume significant computational resources or significant despreading resources in the RAKE receiver. Moreover, the 3GPP specifications may be extended to include 4-branch MIMO in WCDMA HSDPA. If so, the base station transmits second and third S-CPICH signals from Tx antennas 3 and 4 as phase references. That is, there will be three secondary pilot signals being transmitted from second, third, and fourth Tx antenna elements, in addition to the common pilot signal being transmitted from a first Tx antenna element. Advantageously, as explained, blind detection as taught herein provides for the blind detection of any number of secondary pilot signals, and the channelization code identities gleaned from that blind detection allow the receiver 30 to regenerate the interfering secondary pilots for use in interference suppression.

With the above example approaches in mind, in at least one embodiment, the evaluation circuit 38 is configured to evaluate the detection results by selecting a maximum one of the detection results and determining that the secondary pilot signal 16 is present when the maximum detection result exceeds the remaining detection results by a defined margin. That is, for K candidate channels, there will be K detection results accumulated and the maximum one of those K results can be compared to the remaining K−1 results, with the difference obtained from each comparison evaluated against a defined margin, e.g., if the maximum detection result is substantially bigger than the other detection results, then it is very likely that a secondary pilot signal is present on the channelization code corresponding to the maximum detection result.

Of course, there may be multiple secondary pilot signals 16 present in the received composite signal 52. Thus, in at least one embodiment, the evaluation circuit 38 is configured to blindly detect whether any one or more of the multiple secondary pilot signals 16 is present on any of the candidate channels by identifying a subset of less than all of the detection results that have the greatest magnitudes among all of the detection results. Those detection results not included in the subset are considered as "remaining detection results." The evaluation circuit 38 thus determines whether each detection result in the subset exceeds (each one of) the remaining detection results by a defined margin. If so, it deems a corresponding one of the multiple secondary pilot signals 16 to be present in the received composite signal 52.

Put simply, out of K detection results accumulated for K candidate channels by the updating circuit 36, the evaluation circuit 38 in at least one embodiment identifies, say, the n largest ones of the detection results, where n<K and where the K−n detection results represent the remaining detection results. Each one of the n detection results is compared to individual ones of the remaining detection results and, if it exceeds all of the remaining detection results by a defined margin, the corresponding channelization code is considered to carry a secondary pilot signal 16.

Of course, however accumulated, the blind detection circuit 32 is configured to evaluate the accumulated detection results to blindly detect whether a secondary pilot signal 16 is present on any of the candidate channels. In this regard, the measurement circuit 34 is configured to, for each measurement interval 60, measure a signal energy for the received composite signal 52 on a selected one of the candidate channels. In complementary fashion, the updating circuit 36 is configured to, for each such measurement interval 60, logically decide whether secondary pilot signal energy is present based on comparison of the measured signal energy to a comparison threshold, and update the detection result for the selected candidate channel by an amount dependent upon the logical decision.

In one or more embodiments, the interference cancellation circuit 40 is configured to suppress interference arising from secondary pilot signal 16 in the received composite signal 52 or in a desired signal included within the received composite signal 52. Such suppression is done in response to the blind detection circuit 32 detecting the presence of the (interfering) secondary pilot signal 16, and such detection and suppression may be performed for more than one detected secondary pilot signal 16.

In the same or other embodiments, the measurement circuit 34 is configured to measure the signal energy for the received composite signal 52 on the selected candidate channel by determining a signal-to-interference ratio (SIR) for the selected candidate channel and comparing the SIR to the comparison threshold. In at least one such embodiment, the blind detection circuit 32 is configured to, before comparing the SIR to the comparison threshold, normalize the SIR as a function of a second SIR measured during the same measurement interval by the wireless communication apparatus 10 for a common pilot signal 14 that is present in the received composite signal 52. By normalizing with respect to the common pilot channel signal, the receiver 30 advantageously adapts its blind detection of secondary pilot signal energy to dynamically changing reception conditions.

Figure 6:
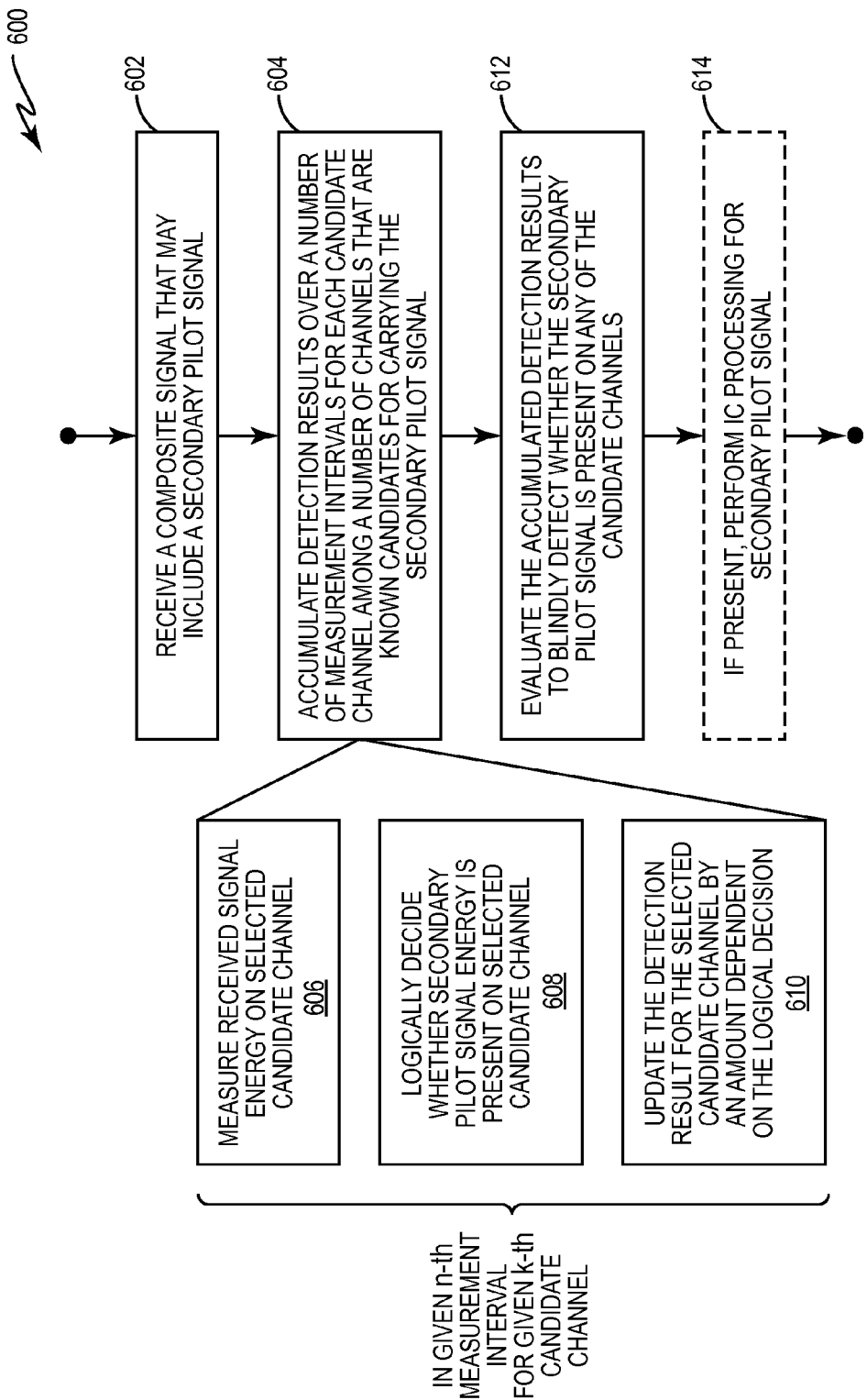
FIG. 6 is a logic flow diagram of further example details for a method of blindly detecting secondary pilot signals.

In particular, FIG. 6 illustrates a method 600 of received signal processing at the apparatus 10. In this regard, FIG. 6 may be understood as a broader or more general depiction of the detailed processing example of FIG. 5. Correspondingly, FIG. 7 illustrates additional context for appreciating the example processing disclosed in the method 600 of FIG. 6.

Figure 7:
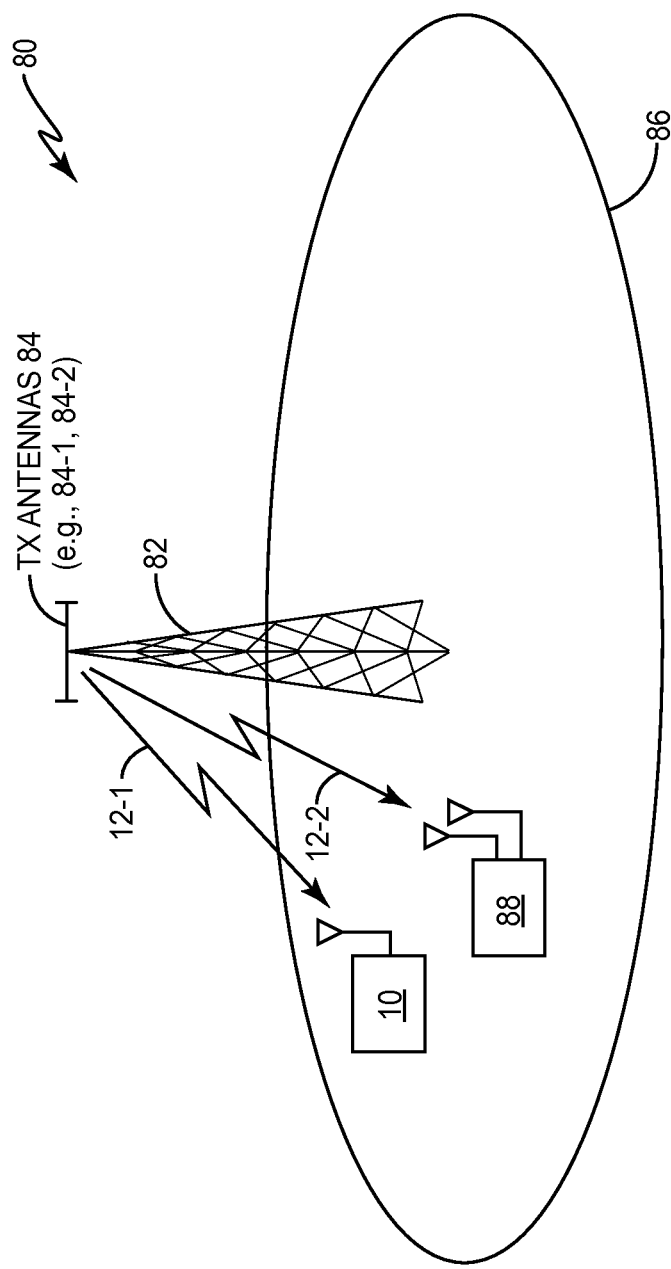
FIG. 7 is a block diagram of one embodiment of a wireless communication network that supports one or more embodiments of the wireless communication apparatus introduced in FIG. 1.

FIG. 7 partially depicts an example wireless communication network 80 that is configured, for example, to provide HSDPA-MIMO transmissions, along with non-MIMO transmissions. The network 80 includes a base station 82 having multiple antennas or antenna elements 84 for MIMO and non-MIMO transmissions to users operating on a given carrier frequency in a corresponding geographic coverage area 86, e.g., a network "cell."

In an example case, such users include the apparatus 10 and another item of user equipment, e.g., a MIMO-capable UE 88. The base station 82 in the illustrated example transmits a non-MIMO downlink signal 12-1 to the apparatus 10 and transmits a MIMO downlink signal 12-2 to the UE 88. It will be appreciated that the channels of interest with respect to the apparatus 10 originate from one antenna 84, while MIMO transmissions to the UE 88 originate from that same antenna 84, plus one or more additional antennas 84 at the base station 82. The secondary pilot signal(s) originating from these additional antennas 84 are necessary for proper channel estimation at the UE 88 but they appear to the apparatus 10 as colored interference in its received composite signal 12.

Thus, referring back to the illustrated method 600, one sees that it includes receiving (Block 602) a composite signal 52 that may include a secondary pilot signal 16 transmitted from a remote antenna 84 that is not used for serving the apparatus 10. The method 600 further includes the apparatus 10 accumulating (Block 604) detection results over a number of measurement intervals 60 for each candidate channel among a number of candidate channels that are known candidates for carrying the secondary pilot signal 16.

Such processing includes, in each measurement interval 60: measuring (Block 606) a signal energy for the received composite signal 52 on a selected one of the candidate channels and logically deciding (Block 608) whether secondary pilot signal energy is present based on comparing the measured signal energy to a comparison threshold; and updating (Block 610) the detection result for the selected candidate channel by an amount dependent upon the logical decision. Correspondingly, the overall method 600 includes evaluating (Block 612) the accumulated detection results to blindly detect whether the secondary pilot signal 16 is present on any of the candidate channels.

Still further, in at least one embodiment, the method 600 includes, in response to blindly detecting that the secondary pilot signal 16 is present on one of the candidate channels, suppressing interference (Block 614) arising from the secondary pilot signal 16 in the received composite signal 52 or in a desired signal included within the received composite signal 52. Note here that "the pilot signal" should be understood as referring to any one of one or more detected secondary pilot signals, and the method 600 directly applies to the case where the apparatus 10 detects secondary pilot signal energy on more than one of the channels that are known candidates for carrying secondary pilot signals.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed, and that modifications and other embodiments are intended to be included within the scope of this disclosure. Although specific terms may be employed herein, they are used in a generic and descriptive sense only and not for purposes of limitation.

What is claimed is:

1. A method of received signal processing at a wireless communication apparatus comprising:
   receiving a composite signal that may include a secondary pilot signal transmitted from a remote antenna not used for serving the wireless communication apparatus;
   accumulating detection results over a number of measurement intervals for each candidate channel among a number of candidate channels that are known candidates for carrying the secondary pilot signal, including, in each measurement interval: measuring a signal energy for the received composite signal on a selected one of the candidate channels and logically deciding whether secondary pilot signal energy is present based on comparing the measured signal energy to a comparison threshold, and updating the detection result for the selected candidate channel by an amount dependent upon the logical decision;
   evaluating the accumulated detection results to blindly detect whether the secondary pilot signal is present on any of the candidate channels; and
   in response to blindly detecting that the secondary pilot signal is present on one of the candidate channels, suppressing interference arising from the secondary pilot signal in the received composite signal or in a desired signal included within the received composite signal.

2. The method of claim 1, wherein measuring the signal energy for the received composite signal on the selected candidate channel comprises determining a signal-to-interference ratio (SIR) for the selected candidate channel and comparing the SIR to the comparison threshold.

3. The method of claim 2, further comprising, before comparing the SIR to the comparison threshold, normalizing the SIR as a function of a second SIR measured during the same measurement interval by the wireless communication apparatus for a common pilot signal that is present in the received composite signal.

4. The method of claim 2, wherein the SIR comprises a RAKE-SIR corresponding to a RAKE-combined signal obtained from a number of RAKE receiver fingers in the wireless communication apparatus that are allocated to the selected candidate channel in each measurement interval.

5. The method of claim 1, wherein each measurement interval comprises a transmission slot, and wherein accumulating the detection results comprises updating the detection result for a respective one of the candidate channels in a respective measurement interval in a set of successive measurement intervals, and repeating the updating over a superset of the sets of successive measurement intervals, so that the detection result for each candidate channel is accumulated over a defined number of respective measurement intervals within the superset.

6. The method of claim 5, wherein accumulating the detection result for each candidate channel over the defined number of respective measurement intervals within the superset comprises calculating an exponentially-filtered detection result for each candidate channel over the superset.

7. The method of claim 6, wherein the detection result for any k-th one of the candidate channels is expressed as DR(k), wherein there are N updates determined for accumulating the detection result for each candidate channel, with one such update per set of successive measurement intervals, such that the superset contains N sets of successive measurement intervals, and wherein each updating comprises $$DR(k)=(1-\lambda)DR(k)+\lambda,$$

if the logical decision in the current update interval for the k-th candidate code is that the secondary pilot signal energy is present, and otherwise comprises $$DR(k)=(1-\lambda)DR(k),$$

wherein $\lambda=1/N$ and $N \geq 1$.

8. The method of claim 1, wherein the candidate channels comprise a set of channelization codes that are reserved for use in transmitting secondary pilot signals.

9. The method of claim 1, wherein evaluating the detection results to blindly detect whether the secondary pilot signal is present on any of the candidate channels comprises selecting a maximum one of the detection results and determining that the secondary pilot signal is present when the maximum detection result exceeds the remaining detection results by a defined margin.

10. The method of claim 9, wherein there may be multiple secondary pilot signals present in the received composite signal, and wherein evaluating the accumulated detection results to blindly detect whether the secondary pilot signal is present on any of the candidate channels comprises identifying a subset of less than all of the detection results that have the greatest magnitudes among all of the detection results, wherein those detection results not included in the subset are considered as remaining detection results, and determining whether each detection result in the subset exceeds the remaining detection results by a defined margin and, if so, deeming a corresponding one of the multiple secondary pilot signals to be present in the received composite signal.

11. A method of received signal processing at a wireless communication apparatus comprising:
receiving a composite signal that may include a secondary pilot signal transmitted from a remote antenna not used for serving the wireless communication apparatus;
accumulating detection results over a number of measurement intervals for each candidate channel among a number of candidate channels that are known candidates for carrying the secondary pilot signal, including, in each measurement interval: measuring a signal energy for the received composite signal on a selected one of the candidate channels and logically deciding whether secondary pilot signal energy is present based on comparing the measured signal energy to a comparison threshold, and updating the detection result for the selected candidate channel by an amount dependent upon the logical decision; and
evaluating the accumulated detection results to blindly detect whether the secondary pilot signal is present on any of the candidate channels;
wherein, for any given measurement interval, measuring the signal energy for the received composite signal on the selected candidate channel comprises computing a signal-to-interference ratio (SIR) for the received composite signal, as measured on the selected candidate channel, and logically deciding whether the secondary pilot signal energy is present comprises determining whether the SIR is greater than the comparison threshold.

12. A wireless communication apparatus comprising:
a receiver configured to receive a composite signal that may include a secondary pilot signal transmitted from a remote antenna not used for serving the wireless communication apparatus; and
a blind detection circuit configured to:
accumulate detection results over a number of measurement intervals for each candidate channel among a number of candidate channels that are known candidates for carrying the secondary pilot signal; and
evaluate the accumulated detection results to blindly detect whether the secondary pilot signal is present on any of the candidate channels;
said blind detection circuit comprising:
a measurement circuit configured to, for each measurement interval, measure a signal energy for the received composite signal on a selected one of the candidate channels; and
an updating circuit that is configured to, for each such measurement interval, logically decide whether secondary pilot signal energy is present based on comparing the measured signal energy to a comparison threshold, and update the detection result for the selected candidate channel by an amount dependent upon the logical decision;
wherein the wireless communication apparatus further comprises an interference cancellation circuit and is configured, in response to blindly detecting that the secondary pilot signal is present on one of the candidate channels, suppress interference arising from the secondary pilot signal in the received composite signal or in a desired signal included within the received composite signal.

13. The wireless communication apparatus of claim 12, wherein the measurement circuit is configured to measure the signal energy for the received composite signal on the selected candidate channel by determining a signal-to-interference ratio (SIR) for the selected candidate channel and comparing the SIR to the comparison threshold.

14. The wireless communication apparatus of claim 13, wherein the blind detection circuit is configured to, before comparing the SIR to the comparison threshold, normalize the SIR as a function of a second SIR measured during the same measurement interval by the wireless communication apparatus for a common pilot signal that is present in the received composite signal.

15. The wireless communication apparatus of claim 13, wherein the receiver comprises a RAKE receiver having a plurality of RAKE fingers, and wherein the SIR comprises a RAKE-SIR corresponding to a RAKE-combined signal obtained from a number of the RAKE fingers in the receiver that are allocated to the selected candidate channel in each measurement interval.

16. The wireless communication apparatus of claim 12, wherein each measurement interval comprises a transmission slot, and wherein the blind detection circuit is configured to accumulate the detection results by updating the detection result for each one of the candidate channels in a respective measurement interval in a set of successive measurement intervals, and repeating the updating over a superset of the sets of successive measurement intervals, so that the detection result for each candidate channel is accumulated over a defined number of respective measurement intervals within the superset.

17. The wireless communication apparatus of claim 16, wherein the blind detection circuit is configured to accumulate the detection result for each candidate channel over the defined number of respective measurement intervals within the superset by calculating an exponentially-filtered detection result for each candidate channel over the superset.

18. The wireless communication apparatus of claim 17, wherein the blind detection circuit is configured so that the detection result for any k-th one of the candidate channels is expressed as $DR(k)$, wherein there are N updates determined for accumulating the detection result for each candidate channel, with one such update per set of successive measurement intervals, such that the superset contains N sets of successive measurement intervals, and wherein each updating comprises $$DR(k)=(1-\lambda)DR(k)+\lambda,$$

if the logical decision in the current update interval for the k-th candidate code is that the secondary pilot signal energy is present, and otherwise comprises $$DR(k)=(1-\lambda)DR(k),$$

wherein $\lambda=1/N$ and $N \geq 1$.

19. The wireless communication apparatus claim 12, wherein the candidate channels comprise a set of channelization codes that are reserved for use in transmitting secondary pilot signals.

20. The wireless communication apparatus claim 12, wherein the blind detection circuit includes an evaluation circuit that is configured to evaluate the detection results by selecting a maximum one of the detection results and determining that the secondary pilot signal is present when the maximum detection result exceeds the remaining detection results by a defined margin.

21. The wireless communication apparatus of claim 20, wherein there may be multiple secondary pilot signals present in the received composite signal, and wherein the evaluation circuit is configured to blindly detect whether any one or more of the multiple secondary pilot signals is present on any of the candidate channels by identifying a subset of less than all of the detection results that have the greatest magnitudes among all of the detection results, wherein those detection results not included in the subset are considered as remaining detection results, and determining whether each detection result in the subset exceeds the remaining detection results by a defined margin and, if so, deeming a corresponding one of the multiple secondary pilot signals to be present in the received composite signal.

22. A wireless communication apparatus comprising:
a receiver configured to receive a composite signal that may include a secondary pilot signal transmitted from a remote antenna not used for serving the wireless communication apparatus; and
a blind detection circuit configured to:
accumulate detection results over a number of measurement intervals for each candidate channel among a number of candidate channels that are known candidates for carrying the secondary pilot signal; and
evaluate the accumulated detection results to blindly detect whether the secondary pilot signal is present on any of the candidate channels;
said blind detection circuit comprising:
a measurement circuit configured to, for each measurement interval, measure a signal energy for the received composite signal on a selected one of the candidate channels; and
an updating circuit that is configured to, for each such measurement interval, logically decide whether secondary pilot signal energy is present based on comparing the measured signal energy to a comparison threshold, and update the detection result for the selected candidate channel by an amount dependent upon the logical decision;
wherein, for any given measurement interval, the measurement circuit is configured to measure the signal energy for the received composite signal on the selected candidate channel by computing a signal-to-interference ratio (SIR) for the received composite signal, as measured on the selected candidate channel, and wherein the updating circuit is configured to logically decide whether the secondary pilot signal energy is present by determining whether the SIR is greater than the comparison threshold.

* * * * *